United States Patent [19]

Cheng et al.

[11] 4,025,657

[45] May 24, 1977

[54] EXTRUDED STARCH PRODUCT FOR TAPIOCA-STYLE PUDDING

[75] Inventors: Hsiung Cheng; William S. Huebner, both of Decatur, Ill.

[73] Assignee: A. E. Staley Manufacturing Company, Decatur, Ill.

[22] Filed: Feb. 24, 1975

[21] Appl. No.: 552,579

[52] U.S. Cl. .............................. 426/579; 426/661; 426/464; 127/71

[51] Int. Cl.² .................. A23L 1/187; A23L 1/195

[58] Field of Search .................. 127/33, 34, 71; 426/579, 661, 464

[56] References Cited

UNITED STATES PATENTS

| | | | |
|---|---|---|---|
| 1,129,440 | 2/1915 | Anderson | 127/32 |
| 2,168,524 | 8/1939 | Horesi | 127/32 |
| 2,431,512 | 11/1947 | Schopmeyer | 127/32 |
| 2,508,533 | 5/1950 | Olsen | 127/32 |

Primary Examiner—Jeanette M. Hunter
Attorney, Agent, or Firm—Howard J. Barnett; Charles J. Meyerson

[57] ABSTRACT

An ingredient for enhancing the texture and organoleptic properties of tapioca-style pudding. Granular starch is pre-extruded under controlled conditions to obtain partially gelatinized spheroidal starch particles for use in tapioca-style puddings. The spheroidal starch particles (or "pearls") retain their spheroidal shape in the finished pudding, thereby providing excellent texture, appearance and mouthfeel to the pudding. The starch pearls, after cooking, consistently provide the highly desired translucent appearance expected in home cooked, tapioca-style puddings.

The extrusion process is cooled by water at a temperature below 100° F. at an extrusion rate which only partially gelatinizes the starch. The granular starch is supplied to the extruder at 25–50% moisture, and the extrudates are cut into particles suitable for a particular use by a cutting means as the extrudates emerge from the extruder die orifices. The particles are then dried, as by oven drying, to less than about 12% moisture, dry solids basis. The drying temperature should be kept low enough to avoid additional gelatinization of the partially gelatinized starch particles. Particularly suitable starch particles for use in automated canning process have been found to be gelatinized to a level of about 45–70% by weight, dry solids basis.

30 Claims, No Drawings

EXTRUDED STARCH PRODUCT FOR TAPIOCA-STYLE PUDDING

BACKGROUND OF THE INVENTION

Increasing popularity of prepackaged foods has encouraged food manufacturers to expand the number and types of foods supplied, especially in the area of single serving sizes which have found a large market with persons who carry a light meal with them from their place of residence to work, school, or some other place remote from home.

The appeal of prepackaged puddings for this market must reside largely in their desirable taste, mouthfeel, and appearance. This is particularly true for homestyle tapioca puddings, which have a very distinctive appearance, and include characteristic and uniformly dispersed tapioca particles in the form of opalescent or translucent pearls comprising gelatinized tapioca starch particles. These particles are expected in tapioca pudding because of the long history of their presence there, so any mass produced tapioca pudding is also expected to contain the same type of starch pearls.

Another important consideration is taste. It is important that the mass-produced pudding taste as much as possible like the home cooked counterpart. A part of this overall impression of taste is the texture, appearance and mouthfeel, cumulatively referred to as the organoleptic properties.

DESCRIPTION OF THE PRIOR ART

Efforts have already been made to make aseptic process tapioca puddings using commercial, "pearled" tapioca starch. Such "pearled" tapioca starch is reportedly obtained by manual operations when made in smaller facilities, and in larger factories mechanical means are employed in which gelatinization is accomplished by direct application of steam.

In one such system, the starch is poured in a thick layer onto plates disposed on an endless conveyor, and the plates are then conveyed through a tunnel charged with steam to insure uniform gelatinization. The process is apparently designed to insure nearly complete gelatinization.

A heated cylindrical device revolving on rollers is also reported to be used in Malaysia to make tapioca starch pearls. It is said that each bead is uniformly gelatinized all over its surface. See: Dr. M. Grace, *Processing of Cassava*, Agr. Services Bulletin No. 8, FAO, UN, Rome, 1971.

Pearled tapioca has been reportedly made in Brazil by placing raw moist starch in a tube having a perforated plate at one end, the perforated openings ranging from 3–5 mm in diameter. The moist starch is then compressed by a piston inserted at the open end to force the starch through the openings in rodlike shapes which fall to the surface of the starch cooking unit, and break up into small granules, approximately spherical in shape. The cooling unit is heated and agitated to assure uniform gelatinization of the outer surfaces of the formed starch particles, or pearls. As with the methods described above, the object seems to be to enrobe or surround uncooked starch with gelatinized starch.

Partial gelatinization of starch by means of extrusion is disclosed in U.S. Pat. No. 3,622,677 issued Nov. 23, 1971, however, this product, in its preferred embodiment, is derived from cornstarch and is used as a binder-disintegrant in direct compression tabletting. No other use is disclosed, and the compacted-starch is not subjected to any heat process when the tablets are made. In addition, this product is ground to a free-flowing powder.

U.S. Pat. No. 2,098,293 issued Nov. 9, 1937, is directed to a process for making partially gelatinized cornstarch grits in the form of flakes. The process is carried out on heated hollow rolls at a temperature of about 290° F. The resulting "dustless grits" product is used as a paper size and for malting. The main purpose of this process appears to be to make a dustless cornstarch product which is completely gelatinized, and is used primarily as a nutrient in malting.

U.S. Pat. No. 2,431,512 issued Nov. 25, 1957 is directed to a method of making waxy starch granules which are resistant to disintegration in tapioca-like pudding or other dessert. The method appears to be similar to that used to make tapioca pearl. A moist waxy starch mixture is applied in a thin layer on a hot plate and vigorously stirred until the starch is pasted and forms plastic pellets which are then dried to a moisture content of 10–15%. A minor amount of regular corn starch can be blended into the waxy starch to prevent the pellets from dissolving too readily when cooked. Extruding the pasted waxy starch into pellets is also suggested. The temperature employed indicates the product is typically completely gelatinized.

A two-step process for preparing fruit pudding is described in U.S. Pat. No. 3,770,461 issued Nov. 7, 1973. Water, sugar and starch are preblended and sterilized. An edible acid-flavoring base is prepared and separately sterilized. The above components are mixed to form a fruit pudding, and then aseptically canned.

Aseptic canning is described in Desrosier, N. W., *The Technology of Food Preservation*, AVI Publishers, 3rd edition, 1970, pp. 230, 231. As described there, condensed milk is first concentrated in a falling film evaporator and then flash-heated and cooled in a tubular type heat-exchange system. The process is said to be advantageous for heavy or viscous products which are adversely affected by sterilization in a sealed container. Specific formulations suitable for aseptic canned vanilla pudding, and other flavored puddings are disclosed in an article by Jack McGowan, entitled, *What's Behind Those Successful New Ready-to-Eat Puddings?*, Food Product Development, August-September, 1970, pp. 16 and 18. This article describes the UHTST (ultra-high temperature, short time) cooking of ready-to-eat puddings and aseptic canning, following the general process disclosed by Desrosier (ibid). The pudding ingredients (milk, flavoring, starch, etc.) are placed in holding tanks, then combined into a slurry that is pumped through a series of preheater units. The preheaters bring the slurry up to about 140°–150° F., and the slurry is then moved to a cooker where it is heated rapidly to 285°–305° F. for a very short time (8–12 seconds). The slurry goes from the cooker through a series of coolers that lower the temperature, and then the cooked slurry is aseptically canned, or more conventionally packaged in other containers which are sealed, ready for refrigeration or freezing.

The aseptic canning process, when it is included at the end of a UHTST food process system, includes a can sterilizer, into which the open cans are conveyed. After the cans and covers have been sterilized, as by superheated steam, the cans are conveyed to a filling station, also having a sterile atmosphere, and the cans are filled. From there, the filled cans are conveyed to a sealer. After sealing the sterilized covers on the cans, they are then conveyed out of the sterile atmosphere, ready for distribution.

The advantages of the UHTST aseptic canning system are reported to include better preservation of product texture, better flavor and better overall appearance. Such products are not subject to long heat treatments common to retort systems, so the natural color of the pudding is maintained. Off-flavors caused by heat or heat-metal reaction are avoided, so the process is, therefore, one which is well adapted to bland-flavored, neutral pH puddings, such as tapioca puddings.

According to McGowan (ibid), some attempts have been made to make conventionally retorted, ready-to-eat canned puddings, but without notable success. More recently, some retorted puddings have been reintroduced, but to our knowledge, no retorted tapioca-style pudding has been available commercially. The extreme processing conditions were reported by McGowan to cause flavor and texture problems in retorted puddings. This application further indicates success in dry pre-mix puddings, using blends of modified starches with unmodified corn starch, and that the trend is towards smooth, creamy texture, accomplished by using higher percentages of modified tapioca starch. No mention is found here of a tapioca style pudding similar to the homestyle tapioca puddings, long made from pearl tapioca, and which intentionally include a quantity of translucent spheroidal particles of undissolved tapioca starch (pearls) to provide a characteristic texture, appearance and mouthfeel.

Retorted puddings and desserts, and other canned foods which are subjected to high temperature sterilization after the individual cans are filled require longer heat treatment than that required for UHTST aseptic canning systems described above. In a typical retort system, the blended ingredients to be retorted are heated in a steam bath to about 175° F. The cans are then filled with the heated blend of ingredients and sealed. The sealed cans are placed in a continuous retort, and retorted with agitation to a sterility level of 10 ($F_o$) at 250° F. retorting temperature, which may take from 10–20 minutes or more, depending on the heat penetration rate, the size of the container, and mass of the food being retorted, as well as other characteristics of the food being processed. Applicants do not know of any commercially available, tapioca starch pearl which could withstand the severe conditions of temperature and pressure of the continuous retort process to provide a retorted, tapioca-style pudding of good texture, mouthfeel and appearance, and a good level of pearl retention.

To our knowledge, all prior tapioca starch pearls available commercially have been made either by direct steam gelatinization or by drum gelatinization methods followed with drying and screening steps. Such products have been expensive, and have exhibited great variation in quality (particle size, hydration rate, viscosity, pearl retention, etc.). Until now, there has been no commercial tapioca pearl starch which is adaptable both to retort canning systems and to the aseptic canning process to provide uniform texture, appearance and mouthfeel equivalent to a homestyle tapioca pudding characterized by the distinct, opalescent spheroidal pearls, uniformly distributed throughout the pudding.

SUMMARY OF THE INVENTION

This invention is directed to partially gelatinized, spheroidal starch particles obtained by cold extrusion of the granular starch at about 25–50% moisture. The extrudates are then cut into particles which are uniform in size, and have a generally cylindrical, or spheroidal shape. The starch granules are sufficiently gelatinized to bind together the ungelatinized portion of the starch in discrete spheroidal particles.

The process of extruding is intentionally performed under conditions which will only partially gelatinize the starch, but will cause it to bind together. At the present time, tapioca starch has provided the best spheroidal particles for aseptic processed puddings in single serving size cans when it is cold extruded through a Bonnot 2½ extruder at a cooling water temperature below 100° F. The input starch preferably has a moisture content ranging from 25–50% by weight of the starch, dry substance. The extruder die may have any practical number of spaced apart openings ranging from about 1/32 to ¼, and a cutting device is provided adjacent the extruder to uniformly cut the emerging extrudates into short lengths (about 1/32 to ¼), which after drying, will preferably pass through a U.S. number 3 mesh, but are retained on a U.S. number 6 mesh. The spheroidal particles are dried at a relatively low temperature to avoid further gelatinization to that accomplished by the cold extrusion. It has been found that oven drying below the gelatinization temperature of the starch (at less than about 145° F. for tapioca) is satisfactory to obtain a finished product having less than about 12% moisture, dry solids basis.

Other types of starch may also be used instead of tapioca starch. However, it is presently believed that tapioca performs best under the above conditions, and that somewhat different conditions are required to adapt the process to making partially gelatinized spheroidal starch particles with other starches, such as potato, sago, arrowroot, yellow dent corn, and cereal starches generally, and modified starches from these sources, as well as combinations of these, including crosslinked etherified and esterified starches. Attempts to extrude high amylopectin starches containing substantially no amylose under the above conditions have been more successful when the amylopectin starch is mixed with an amylose-containing starch, so it is possible that some level of amylose is required to bind the partially gelatinized, extruded particles in the desired spheroidal shape. Potato starch is extrudable and performs well in those tests which show it suitable for home made foods.

Potato starch-corn starch blends have proven useful when the blend is thoroughly mixed and extruded so as to provide only a limited gelatinization effect in the extruded spheroidal particles. The blended-extruded product has the desirable properties obtained by extruding pure granular tapioca. Such properties include starch pearl retention in cooked puddings, and the texture, mouthfeel and appearance of homestyle tapioca pudding.

The remaining ingredients in the retorted, aseptically canned, tapioca product include a starch thickener, which gives the product a relatively thick, pudding-like viscosity. Many such thickeners, which thicken upon retorting are believed to be suitable. The presently preferred thickener is an epichlorohydrin crosslinked, hydroxypropylated tapioca starch, which cooks up to the desired consistency during the UHTST, aseptic canning process. When such a starch is used in combination with the partially gelatinized spheroidal particles of the subject invention in automated, continuous process aseptic canning, the spheroidal particles remain intact during the high temperature sterilization, and these spheroidal particles finish cooking to provide a mass produced tapioca pudding having the highly desirable texture, appearance and mouthfeel characteristics of home-style tapioca puddings. Most of the spheroidal particles remain intact, but undergo some swelling to take on the highly desirable opalescent or translucent pearl appearance in the finished pudding product.

DETAILED DESCRIPTION OF THE INVENTION

EXAMPLE I

Granular food grade tapioca starch from Thailand was adjusted to a moisture content of 36% by adding water and blending in a ribbon blender to mix thoroughly. The starch (36% moisture content) was then extruded through a Bonnot Cooking Extruder (Model 2¼, manufactured by the BONNOT COMPANY, Kent, Ohio), provided with a rotary cutter, which is rpm adjustable. The following conditions and equipment were used:
1. The die: 177 round holes, 1/16 inch diameter; 2. Screw speed: 28 rpm (screw compression ratio: 4:1);
3. All 4 cooling water temperature control settings were maintained at 80°± 5° F.
4. Air was circulated across the die face as needed to prevent sticking of particles.
5. Cutter rpm was adjusted to cut the extrudates as nearly as possible into lengths equal to their diameter (in this case 1/16 inch). Depending on die size, diameter of the extrudate may range from 1/32 up to ¼ inch or even larger, if there is a need for a larger size.

The cut, extruded tapioca particles were then carefully dried under conditions to avoid further gelatinization in a forced air oven at 130°–135° F. The final moisture content should be 12% maximum. The particles were then screened through a U.S. number 8 on a Roball. The particles which passed through the U.S. number 8 screen were collected as product. The screen analysis for the product should be:

| | |
|---|---|
| Retained on U.S. No. 8 screen (15 min. Ro-Tap) | 2% maximum |
| Pass through U.S. No. 12 screen (15 min. Ro-Tap) | 30% maximum |
| Amylograph Pearl Retention and Viscosity (Test No. 3) | |
| Final viscosity | 100 B.U., maximum |
| Drained weight | 135 g. minimum |
| Test for % gelatinized starch (Test No. 7) | 50–65% |

This product has performed well in UHTST aseptic canned puddings, and also retains desirable starch pearl texture in retort puddings and for homestyle tapioca puddings. Test procedures 1-7 are set forth following Example VII below.

EXAMPLE II

The same procedure was followed as set forth above to extrude a blend of 70% granular potato starch and 30% corn starch (dry solids basis). The dried product was tested with the results set forth below:

| | |
|---|---|
| Moisture content | 12% maximum |
| Retained on U.S. No. 8 screen (15 minute Ro-Tap) | 2% maximum |
| Pass through U.S. No. 12 screen (15 minute Ro-Tap) | 30% maximum |
| Amylograph: starch pearl retention and viscosity test (Test No. 3) | |
| Final Brabender Viscosity | 30 B.U. |
| Drained Weight | 128 grams |
| Test for percent gelatinized starch (Test No. 7) | 60–70% |

When the above starch blend was tested in a retorted pudding using the pudding recipe of Test No. 4 below, and the test procedure of Test No. 5 below, the product produced good, rather large starch pearls, and the pudding was of a good consistency.

EXAMPLE III

An attempt was made to make a retorted starch pearl containing pudding using the partially gelatinized starch of U.S. Pat. No. 3,622,677 (Technique 1 of Example I). The pellets were ground and screened so that the starch sample used in the retorted pudding had a screen analysis similar to Example I above. The resulting starch particles were tested following the Amylograph Test Procedure No. III below. Only 15 grams of drained weight starch particles remained after the test was completed. The final Brabender viscosity was 30 B.U., and the product was very soft.

The enzyme test Procedure No. VII below confirmed that this pelletized product had a substantially higher level of gelatinization (76.7%) as compared to the partially gelatinized, extruded starch pearls of the subject invention, which range from about 45–70% gelatinization following Test Procedure No. 7.

EXAMPLE IV

One hundred percent potato starch was extruded as described above in connection with Example I using barrel temperatures of 40° and 80° F., respectively. The extruder ram was driven at the slowest possible speed (28 rpm). The resulting product was dried in a forced air oven overnight at 100° F.

When the resulting potato starch particles were subjected to the amylograph starch retention and viscosity test set forth below under Test Procedure No. III, the drained weight was 105 g., and the final Brabender reading was 130 B.U. The hot plate starch pearl retention test following Test Procedure No. 2 set forth below was performed with the following results: starch pearl retention index 52 ml; drained weight of retained pearls 105 grams. The above weights were low, but the starch pearls retained looked good in texture, and general appearance. It could be judged this product would at least be useful in homestyle puddings for domestic use.

EXAMPLE V

A sample of the granular, partially gelatinized tapioca starch particles presently available from Brazil was also tested for the level of gelatinization using the Test Procedure No. 7, set forth below. This product had a solubilization level of 80.4%, which is considerably higher than the preferred starches of the invention, which range from about 50–65% gelatinized. This test indicates there is a practical upper limit of gelatinization above which erratic starch behavior may be expected. At the present time, it appears that this upper limit may be about 70% gelatinized starch.

EXAMPLE VI

Yellow dent cornstarch was extruded following the procedure set forth in Example I above. Tests of this cornstarch pearl were generally favorable. The starch pearls retorted well. The pearls after retorting remained relatively small and quite firm. The percentage gelatinization for this sample was about 61% following Test Procedure No. 7.

The above sample was extruded using a 4:1 compression ratio extruder screw, or ram, on the Bonnot extruder. Extruder screws having compression ratios from about 8:1 to 2:1 are available for this extruder system. When a softer, less gelatinized product is desired, a lower compression ratio extruder screw is used. Adjusting the rpm of the extruder screw also provides a means for varying the firmness and the gelatinization level of the extruded spheroidal, or cylindrical particles. When desired, cooling water can be circulated through the extruder cooling system.

EXAMPLE VII

A taste panel test was conducted, comparing retorted puddings made from the extruded starch pearl of Example I above and the partially gelatinized, commercial product described in Example V above.

A. PUDDING FORMULA

The pudding formula for each sample was made up according to the following recipe:

| Emulsion Portion Ingredient | % | Amount in grams |
| --- | --- | --- |
| Milk solids, non-fat | 7.91 | 200 |
| Sugar | 7.91 | 200 |
| Fat | 4.74 | 120 |
| Emulsifier (Durem 187)* | .32 | 8 |
| Water | 79.1 | 2000 |

*Glidden-Durkee Div. - SCM Corp., Chicago, Ill.

The above portion was premixed, heated and homogenized as in Test No. 4 below.

| Flavor formula proportions | |
| --- | --- |
| Vanilla flavor* | 10 |
| Custard flavor (Warner-Jenkinson, Inc.) | 10 |
| Egg flavor (Warner-Jenkinson, Inc.) | 2.5 |

*Food Materials Corp., Chicago, Ill.

RETORT PUDDING FORMULA

| | % | Amount in Grams |
| --- | --- | --- |
| Sugar | 5.0 | 16.0 |
| Starch (thickener) | 2.25 | 7.2 |
| Water | 25.4 | 81.28 |
| Emulsifier portion (see above) | 63.2 | 202.24 |
| Starch pearl being tested | 4.0 | 12.8 |
| Flavor portion (set forth above) | | 1.5 |
| Salt | | 1.0 |
| Color | (3 drops No. 5 yellow) | |

All the above ingredients of the retort pudding formula in the proportions stated were blended together and divided into ten samples containing the Example I starch pearl. A second similar set of ten samples was also made, except containing the commercial tapioca particles of Example V. The samples were stirred well, put in a steam bath and heated to 175° F. with constant stirring. The samples were then removed from the steam bath, put in cans (No. 1 Eastern, NCA) and continuously retorted (with agitation) to an $F_o$ of 8 (about 10 minutes) using 255° F. oil bath temperature.

B. TASTE PANEL RESULTS

The above 20 samples (10 samples of Example I and 10 of Example V were presented blind, random arrangement, to a taste panel of 10 members to be ranked for overall preference, texture of starch pearls, and mouthfeel of starch pearls. Each panelist taste tested both types of puddings. Kramer's table for determining significant difference of ranked data was used (See: KAHAN, G., et al., *Expanded Tables for Determining Significance of Differences for Ranked Data*, FOOD TECHNOLOGY, May 1973, Table 1, p. 64). Rank range for significance is 12–18, with ten panelists, 2 samples each. The lower the sum, the greater is the superiority or preference indicated by the panelists.

The Taste Panel results were as follows:

| Sample | Pudding Samples Using Example V Starch | Pudding Samples Using Example I Starch |
| --- | --- | --- |
| Rank Sums: | | |
| Overall preference | 19 | 11 |
| Texture of starch pearls | 19 | 11 |
| Mouthfeel of starch pearls | 20 | 10 |
| Comments | | |
| Overall | gummy, mushy 2, stringy | good, short and even |
| Texture | gluey, stringy 2, various size, mushy, adhesive, gummy 2, soft 5, pulpy, rubbery, pituitous | firm, consistent, smooth 2, short 2, more granule identity, good granule integrity, coarse, granules may be slt. hard |
| Mouthfeel | very little granule feel, granules not distinct, stringy 2, pasty 2, soft, gummy, slimy, pituitous | good, smooth 2, short, firm granules, distinct granule feeling |

As can be seen in the above taste panel evaluation, the extruded starch pearls made following Example I far surpassed the commercial starch pearls of Example V in a direct comparison of retorted puddings. Experience has also indicated that the extruded starch pearls of Example I consistently performed better than the commercial products known to us, both in retorted puddings as described above and in the UHTST, aseptic canned puddings described previously.

TEST PROCEDURES

1.

STARCH PEARL RETENTION TEST CANNED PUDDING

The extruded starch product may be evaluated in UHTST aseptic canned puddings, or retorted puddings using Test Procedure No. 5 recipe as follows:

The finished, canned pudding is opened and the contents are stirred to insure uniform distribution of the starch pearls throughout the pudding sample. Then 300 grams of the pudding is placed in a 2 liter beaker, and 1500 mls. of 140° F. tap water is added, and the sample is stirred gently until the starch pearls separate from the pudding into the water. The sample is then poured on a wet tared U.S. number 20 screen, and the starch pearls retained on the screen are washed with 1000 mls. of 140° F. tap water. The screen is then shook gently and drained for 1 minute and the screen plus contents are weighed. The net weight of starch pearls retained on the screen is recorded as the pearl retention value. A higher number indicates better pearl retention through the canning process when the same percentage weight of partially gelatinized starch pearls are added to the respective pudding samples prior to the UHTST aseptic canning procedure. The possibility does exist that there can be some minor variation between two samples prepared at the same time from the same blended pudding ingredients, so a series of tests from random samples, and an averaging of the results, gives the most reliable pearl retention data. Under typical packing conditions, about 4–9 g, (dry solids basis) of spheroidal starch pearls are added to a seven ounce, single serving can of pudding. A pearl retention value of 3–6.5 g (dry solids basis) or more, is considered an excellent pearl retention level.

2.

HOT PLATE STARCH PEARL RETENTION TEST

The test described directly above required the final canned product in order to make an evaluation. It is frequently more convenient to use the hot plate starch pearl retention test described below:

Boiling distilled water (200 ml) is measured using a 250 ml glass cylinder, and then poured into a 400 ml glass beaker provided with a magnetic stirrer, and then placed on a hot plate equipped with a stirrer (Fisher Thermix, Model 11–493, Fisher Scientific Co.) balanced at 330°–335° F. - Dial setting No. 6). Ten grams of starch pearl (as is), and ten grams of granular sugar (as is) are added to the 400 ml beaker containing the distilled water (temperature of mixture, about 170°–180° F.). The sample is then heated for 25 minutes, and after the 25 minutes of heating, the beaker contents is scraped out into a 1000 ml beaker, and 500 ml distilled water is added. The whole mixture is then stirred with a stainless steel spatula or a glass stirring rod. The beaker contents are then poured evenly on a tared U.S. number 20 screen, shook gently and allowed to drain for 1 minute. The screen and contents are then weighed, and the net weight in grams of the starch pearls retained on the screen is recorded. As before, the higher weight retained is an indication of a more desirable pearl texture starch for UHTST aseptic canning processes. In this test, the highest expected weight of cooked starch pearl retained would be about 75 grams (including gain in water content over the "as is" sample). Any value from 45g up to about 75g (as is basis) is considered a favorable indication of a useful starch pearl for these tapioca style puddings. Moisture content of the starch pearl, from random samples was about 84–87%, based on the dry weight of the starch. The preferred product of the invention consistently gives a starch pearl retained weight above about 55 g. in this test.

3.

AMYLOGRAPH STARCH PEARL RETENTION AND VISCOSITY TEST

First 432.4 g distilled water is added to the Brabender cup in a Brabender Amylograph (fitted with 700 cmg cartridge and operating at 75 rpm) while the temperature is maintained at 30° C. Then 27.6 g "as is" starch is added to the water and the sample is immediately heated while stirring from 30° C. to 95° C. at a rate of 1.5° C/minute. When the pasted sample temperature reaches 95° C., the final reading in Brabender units is recorded. Experience to date has indicated that a useful starch pearl should give a reading in the range of 30–150 B.U.

The contents of the Bradender cup is immediately scraped out into a 2 liter beaker and 1,000 ml of 77° F. distilled water is added. The mixture is stirred with a stainless steel spatula or glass stirring rod. The stirred sample is then poured evenly onto a tared U.S. number 20 screen, which is then shook gently, and allowed to drain for one minute. The screen and contents are weighed and the net sample weight of starch pearl retained is recorded in grams. The weight of the starch pearl sample retained should be in the range of 20–25 grams, dry solids basis, or 135–180 grams "as is" basis to be considered an excellent potential starch pearl for automated canning systems, based on this test. The preferred product consistently gives starch pearl retained value above about 140 grams in this test.

4.

BRABENDER PUDDING TEST FOR STARCH PEARL

A pudding recipe is made up using the following ingredients and proportions:

| Part I (emulsion) | | |
|---|---|---|
| | % | grams |
| Milk solids (non-fat) | 7.91 | 200 |
| Sugar | 7.91 | 200 |
| Fat | 4.74 | 120 |
| Emulsifier (Durem 187)* | .32 | 8 |
| Water | 79.1 | 2000 |

*Glidden-Durkee Div. - SCM Corp., Chicago, Ill.

The above Part I emulsion is pre-mixed together by first dry blending the sugar and milk solids, adding the rest of the ingredients and heating to 145° F. on a steam bath. The mixture is then homogenized on a jet mixer for 3 minutes at the highest speed.

A second portion (Part II), containing the following ingredients is blended with the above Part I emulsion in a 600 ml breaker, and stirred well to slurry the starch:

| | % | grams |
|---|---|---|
| Sugar | 5.00 | 25.00 |

-continued

| | % | grams |
|---|---|---|
| Starch (modified tapioca or modified waxy maize) | 2.25 | 11.25 |
| Water | 25.55 | 127.75 |
| Part I (emulsion) | 63.20 | 316.00 |
| Starch pearls - larger size, | 4.00 | 20.00 |

The blended sample (but without the starch pearls) is then transferred to a Brabender bowl, the temperature set at 60° C., with transport in neutral, with no cooling, and the sample is heated to 60° C. The recorded paper is set at 0 mark, and 20 grams of the starch pearl of the starch to be tested is added, and the sample is heated for 23.3 minutes to 95° C. (with the cooling off, and the transport up). After heating to 95° C., the sample is held at this temperature for 10 minutes. The test sample is then cooled to 45° C. (cooling at "Fast Uncontrolled," transport at neutral and temperature reset to 45° C.) 20–25 min., approximately. After cooling, the pudding sample is immediately poured into a beaker, stirred well, and the Brookfield viscosity is measured using a Number 6 spindle at 20 rpm. The pudding sample is also subjected to Test No. 1 for starch pearl retained. About 14 grams, dry solids basis of retained starch pearl is considered a good product. Texture, mouthfeel and appearance are also evaluated.

5.
RETORT METHOD STARCH PEARL CONTAINING PUDDING

To evaluate the ability of the starch pearl to withstand retorting, the pudding recipe described in Test Procedure No. 4 immediately above is prepared and blended together. These blended ingredients are then heated on a steam bath to 175° F. The heated blend is removed from the steam bath, stirring well. With continued stirring the retort cans (No. 1 Eastern, NCA classification) are filled. The cans are sealed and shook, and then placed in a continuous retort. They are then retorted continuously to an $F_o$ (sterility level) of 8 at 255° F. retorting temperature. The cans are cooled in cold water to approximately room temperature, then opened, and starch pearl retention is evaluated against a control. The product texture, body, mouthfeel and degree of cookout were examined and compared to a control using taste and visual comparison. When appropriate, the product samples were subjected to a taste panel evaluation. In such a test, the test samples, including the control are presented blind in random arrangement to a panel of ten members. The taste panel test is described more fully above in connection with Example VII.

6.
STILL RETORTING FOR EVALUATION OF TEXTURE, BODY AND DEGREE OF COOKOUT

First, eight grams granular starch pearl is weighed into a 400 ml glass beaker, and 192 g water is added. This is stirred gently, and the samples (up to 8 samples) are retorted in an autoclave at 250° F. for 6, 8 or 10 minutes, as desired. After retorting, the products' texture, body and degree of cookout are examined by tasting and visual comparisons. When appropriate, these comparisons and evaluations are made by a ten member taste panel, following the procedure described more fully above in connection with Example VII.

7.
ENZYME ANALYSIS METHOD TO DETERMINE EXTENT OF GELATINIZATION IN EXTRUDED STARCH PEARLS

Alpha-amylase and glucoamylase are used to evaluate the extent to which a particular cold extruded starch pearl sample is gelatinized, since these enzymes will attack gelatinized starch much more rapidly than ungelatinized starch. The alpha-amylase is used first to hydrolyze the starch to a lower molecular weight, and the glucoamylase converts substantially all of the partially hydrolyzed starch to dextrose. The amount of dextrose in the converted starch sample can then be easily measured by a Lane Eynon titration or by a glucose oxidase-peroxidase method performed manually of by a Technicon Autoanalyzer, System No. I using a System No. II Sampler, available from Technicon Instruments, Inc., Tarrytown, New York. Alpha-amylase is not as specific as glucoamylase, and can hydrolyze the starch at various points along the starch molecule, so the combination of the two enzymes as set forth provides a faster and quite reliable determination of the amount of gelatinized starch in a given sample.

The following test procedure is used:

Three gram samples of the starches to be tested are placed in 50 ml volumetric flasks. The particular samples are then increased in volume to 50 ml with 2 ml of 2M pH 6.6 acetate buffer containing 3% calcium propionate, and distilled water. The 50 ml samples are then mixed thoroughly, and transferred to 250 ml stoppered Erlenmeyer flasks with 50 ml water. The flasks are disposed in a shaker water bath at 50° C. After 15 minutes at 50° C., 0.12 ml of alpha-amylase (Ban 120 from Novo, Inc., Copenhagen, Denmark) is added to each flask while shaking at 50° C. is continued. Aliquots of 15 ml are removed from each flask at 1, 2 and 3 hours after the time of enzyme addition, and these aliquots are filtered into test tubes through 12.5 cm fluted filter paper. One tenth milliliter of acetic acid is added to each starch slurry portion as it is being filtered to lower the pH to about 4.3 to stop alpha-amylase activity, and to adjust the pH for glucoamylase hydrolysis. Ten milliliter portions of the filtrates are pipetted into dry test tubes, 0.04 ml Novo glucoamylase (from Novo, Inc., Copenhagen, Denmark) or its equivalent diluted with distiller water to 0.1 ml is added to each 10 ml sample and mixed. The samples are then covered and incubated at 50° C. for 1 hour. Dextrose contents are determined using the Autoanalyzer and a glucose oxidaseperoxidase method.

A reagent blank, prepared as the samples, but without the starch, is run and subtracted from the result for each sample.

Calculations of the percent starch solubilized for a 3.000 g sample is made according to the following equation:

Percent starch solubilized $$= \frac{\% \text{ dextrose as is}}{3.000 \times \frac{\% \text{ D.S.}}{100}} \times \frac{101.8}{100} \times 0.9000 \times 100$$

$$= \frac{\% \text{ dextrose as is}}{\frac{\% \text{ D.S.}}{100}} \times 30.54$$

where
% dextrose as is = dextrose concentration found in the 10 ml of filtrate
% D.S. = dry substance of the starch sample $$\text{Correction for dilution} = \frac{101.8}{100}$$

$$\frac{\text{Equivalent weight of starch}}{\text{Equivalent weight of dextrose}} = 0.9000$$

The % starch solubilized for each sample is plotted against the time of conversion and the resulting straight line extrapolated to zero time. This gives the percentage of gelatinized starch in the sample.

SUMMARY

Applicants presently believe the success of their extruded starch pearls in providing desirable appearance, texture and mouthfeel to such puddings is because the low temperature extrusion process is particularly suitable for shaping the starch in the desired particle size, while only partially gelatinizing the starch so the spheroidal particles or starch pearls are capable of cooking out during the canning process without dissolving. Present tests indicate that the desirable level of gelatinized starch in the extruded spheroidal particles should be between about 45–70% by weight, dry solids basis. When the level of gelatinization greatly exceeds 70%, the starch pearls tend to dissolve during the processing of the pudding. Some compaction and pressure is required to accomplish the desired forming of the spheroidal particles, but this requirement must be balanced to avoid excessive gelatinization so that the spheroidal starch pearls remain intact in the automated canning processes.

There is no grinding step required when the proper die size is selected. The extrudates emerging from the die orifices are cut into the spheroidal particles of the correct size as the extrusion step is carried out. The moisture level in the extrudate and the level of gelatinization are adjusted, along with the cutter knife speed to obtain spheroidal particles of substantially uniform dimension, both length and diameter.

There is no wasted starch when the particles are accurately sized as a result of the above extrusion method, since there is no need for a screening step to remove starch fines. The product is uniformly clean, dustless, and free-flowing to facilitate handling and metering into automated, continuous UHTST, aseptic canning systems, or retort canning systems.

The presently preferred base starch for the starch pearls of this invention is tapioca starch. However, it is also contemplated that extrusion conditions can be adjusted to accept other base starches and blends of these. Good success has been experienced, as set forth above in Example II and VI, using blends of potato and corn starch (II) and also using corn starch alone (VI).

These latter extruded products can be considered adequate substitutes for the extruded tapioca starch pearl in times of critical shortage of tapioca starch. At the present time, both of the latter extruded starch pearl products are less expensive to produce because the base starches are less expensive.

This invention provides a consistent and uniform spheroidal starch particle useful in textured, tapioca-style puddings made under severe temperature and process conditions. These starch particles swell and become more completely gelatinized during the automated canning process to provide distinct, translucent starch pearls of excellent appearance and texture in the finished canned tapioca-style pudding.

Although the actual basis for the success of applicants' partially gelatinized spheroidal, or cylindrical starch particles in automated canned tapioca-style puddings is not fully established, it is presently believed that the forming process as by extrusion in the absence of added heat causes the starch to uniformly gelatinize in an amount sufficient to bind the particles together until use. However, the particles are not gelatinized to the extent found in prior art starch pearls and particles, and there is sufficient granular starch uniformly distributed through all the starch particles to enable the particles to remain as distinct, translucent pearls in a tapioca-style food product or pudding after cooking the product under severe temperature conditions typical of automated continuous canning systems.

Since many embodiments of this invention may be made and since many changes may be made in the embodiments described, the foregoing is interpreted as illustrative and the invention is defined by the claims appended hereafter.

We claim:
1. An edible starch product comprising uniform spheroidal starch particles obtained by extrusion with no added heat, said starch particles having an average level of gelatinization in the range of at least 45 up to about 70% by weight calculated from enzyme conversion of the solubilized portion of the starch to dextrose, each of said particles being gelatinized within about 7.5% of the same average level of partial gelatinization, as measured from random samples of said starch particles, said starch particles being resistant to disintegration on cooking as an ingredient in mass produced pudding processed in an automated high temperature canning system, but capable of swelling without dissolving under such canning conditions to define distinct, uniform translucent starch pearls having a higher moisture content, and providing said pudding with a distinct tapioca-like appearance, texture and mouthfeel.

2. The starch product of claim 1 derived from tapioca starch, and in which no more than about 70% by weight of said starch particles are gelatinized.

3. The starch product of claim 1, derived from corn starch, and in which no more than about 70% by weight of said starch particles are gelatinized.

4. The starch product of claim 1, derived from a blend of potato starch and corn starch, and in which no more than about 70% by weight of said starch particles are gelatinized.

5. The starch product of claim 4, in which potato starch comprises the major portion of the starch blend.

6. The starch product of claim 5, in which potato starch comprises about 70% by weight, dry solids basis of the starch blend.

7. The starch product of claim 5, in which corn starch comprises about 30% by weight of the starch blend.

8. The starch product of claim 5, in which potato starch comprises 70% by weight, and the corn starch comprises 30% by weight of the blend.

9. The starch product of claim 1, in which the spheroidal particles are obtained by extruding a high moisture containing starch in an extrusion system provided with a cutting means which cuts the partially gelatinized starch extrudate into spheroidal starch particles ranging in size from about 1/32 inch up to about ¼ in diameter.

10. The starch product of claims 9, in which the extrusion system includes an adjustable rate screw having a compression ratio in the range of 2:1 to 8:1.

11. The starch product of claim 9, in which the partially gelatinized starch particles are derived from tapioca starch, and the percent by weight of gelatinized starch as calculated by enzyme conversion is in the range from 50–65%, based on the dry weight of the starch.

12. In a premix for a canned tapioca-style pudding, the improvement comprising spheroidal partially gelatinized starch particles capable of providing a translucent, pearl-like texture and appearance to the pudding after high temperature heat sterilization of said pudding premix in a canning process, said partially gelatinized, spheroidal starch particles having a uniform size in the range from about 1/32 to about ¼ inch, and having been preformed by extrusion under controlled conditions without added heat to effect pregelatinization of said particles to an average level within the range of 45 to 70% by weight of said starch particles, and random samples of said starch particles obtained from a particular set of preforming conditions being gelatinized within about 7.5% of the same average level.

13. The product of claim 12, in which the partially gelatinized spheroidal starch particles are formed by extruding a feed starch in an extruder, said feed starch having a moisture content of 25–50% based on the dry weight of the starch, the resulting starch extrudate being cut into short lengths as it emerges from the extruder, thereby forming spheroidal starch particles which are then dried at a temperature sufficiently low to avoid further gelatinization of said starch particles.

14. The product of claim 12 derived from tapioca starch.

15. The product of claim 12 derived from corn starch.

16. The product of claim 12, derived from a blend of potato starch and corn starch in which potato starch comprises the major portion of the starch blend.

17. The product of claim 16, in which potato starch comprises about 70% by weight of the starch blend.

18. Extruded spheroidal starch particles obtained from an extrusion process without added heat, said particles being uniform in size, in the range of 1/32 to ¼ inch, said particles having been uniformly partially gelatinized by said extrusion process to an average gelatinization level in the range of 45–70% by weight of the starch dry solids calculated from enzyme conversion of the solubilized portion of the sample of the extruded starch particles to dextrose, and random samples of the starch particles derived from a particular set of extrusion conditions being uniformly gelatinized within about 5% of the same average level within the range of partial gelatinization.

19. The product of claim 18, in which the starch particles are derived from tapioca starch, and the gelatinization level is from 50–65% by weight of the starch dry solids.

20. The product of claim 18, in which the starch particles comprise corn starch.

21. The product of claim 18, in which the starch particles comprise a mixture of potato starch and corn starch.

22. The product of claim 21, in which the mixture comprises a major portion of potato starch and a minor portion of corn starch, said starch particles being resistant to disintegration on cooking as an ingredient in a tapioca style canned product under automated, high temperature canning conditions, and said starch particles swelling to define distinct, translucent starch pearls to contribute excellent texture, appearance and mouthfeel to the canned product.

23. In an automated process for producing a sterile tapioca-style pudding the improvement comprising the step of adding uniformly partially gelatinized spheroidal starch particles to a premix for said pudding prior to heat sterilization, said spheroidal starch particles having been obtained by subjecting starch containing 25–50% moisture to an extrusion process under pressure without added heat to form the moist starch into uniform spheroidal starch particles which comprise at least 45–70% gelatinized starch based on the weight of the starch dry solids calculated from the percentage of starch which is enzyme-converted to dextrose, said extruded starch particles having been dried at a temperature below the gelatinization temperature of the starch to avoid further gelatinization of the starch during drying, and random samples of the starch particles obtained under a particular set of extrusion conditions being gelatinized within about 7.5% of the same average level within the said range of gelatinization.

24. The process of claim 23, in which the spheroidal starch particles comprise tapioca starch.

25. The process of claim 23, in which the spheroidal starch particles comprise corn starch.

26. The process of claim 23, in which the spheroidal starch particles comprise a mixture of potato starch and corn starch.

27. The process of claim 26, in which the spheroidal starch particles comprise a mixture of a major portion of potato starch and a minor portion of corn starch.

28. The process of claim 23, in which the moist starch is cold extruded and cut into particles in an extruder system provided with cooling and cutting means and the partial gelatinization of the resulting spheroidal starch particles is accomplished primarily by the mechanical working of the moist starch in the extruder system. starch particles derived from a particular set of extrusion conditions being uniformly gelatinized within about 5% of the same average level within the range of partial gelatinization.

29. The process of claim 28, in which the partially gelatinized spheroidal starch particles are thereafter subjected to uniform rapid heat in the automated aseptic canning process for producing a sterile tapioca-style pudding, and swell without dissolving to convert said partially gelatinized spheroidal starch particles into uniformly gelatinized, distinct translucent starch pearls which provide uniform texture, appearance and mouthfeel of a tapioca-style pudding.

30. A process for making spheroidal starch particles useful as a texturizing aid in automated process canned tapioca-style puddings, the steps comprising:
1. preparing a granular starch raw material having about 25–50% moisture;
2. extruding said granular starch through a plurality of 1/32 to ¼ inch dies of a barrel extruder having a screw type ram with screw ratios in the range of 8:1 to 2:1, said extruding being conducted in the absence of any added heat at an extruder barrel temperature ranging from about 40° to 80° F. to form starch extrudates having 45–70% gelatinized starch;

3. cutting the starch extrudates emerging from the extruder in lengths ranging from 1/32 to ¼ to define substantially cylindrical, partially gelatinized spheroidal starch particles;

4. drying said spheroidal starch particles at a temperature below the gelatinization temperature of the starch to a moisture content not more than about 12%.

* * * * *

UNITED STATES PATENT AND TRADEMARK OFFICE
CERTIFICATE OF CORRECTION

PATENT NO. : 4,025,657
DATED : May 24, 1977
INVENTOR(S) : Hsiung Cheng and William S. Huebner It is certified that error appears in the above-identified patent and that said Letters Patent are hereby corrected as shown below:

Column 1, line 59; for "cooling" read ---cooking---
Column 3, line 23; for "application" read ---publication---
Column 4, line 17; for "2 1/2" read ---2-1/4"---
Column 4, lines 21-22; for "1/32 to 1/4" read ---1/32" to 1/4"---
Column 4, line 24; for "1/32 to 1/4" read ---1/32" to 1/4"---
Column 5, Example I, line 22; for "2 1/4" read ---2 1/4"---
Column 5, line 35; for "1/32 up to 1/4 inch" read ---1/32" up to 1/4"---
Column 10, line 63; for "breaker" read ---beaker---
Column 12, line 19; for "of" read ---or---
Claim 9, line 6; for "1/32 inch up to about 1/4" read ---1/32" up to about 1/4"---
Claim 10, line 1; for "claims 9" read ---claim 9---
Claim 28, line 7; for "system, starch particles...gelatinization." read ---system.---
Claim 30, line 15; for "1/32 to 1/4" read ---1/32" to 1/4"---

Signed and Sealed this

Twentieth Day of December 1977

[SEAL]

Attest:

RUTH C. MASON
Attesting Officer

LUTRELLE F. PARKER
Acting Commissioner of Patents and Trademarks